(12) United States Patent
Miyazaki et al.

(10) Patent No.: US 9,135,207 B2
(45) Date of Patent: Sep. 15, 2015

(54) I2C COMMUNICATION DEVICE AND I2C COMMUNICATION METHOD

(75) Inventors: Haruka Miyazaki, Fukuoka (JP); Yuichiro Sakane, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 742 days.

(21) Appl. No.: 12/929,905

(22) Filed: Feb. 23, 2011

(65) Prior Publication Data

US 2011/0229125 A1    Sep. 22, 2011

(30) Foreign Application Priority Data

Mar. 18, 2010   (JP) .................................. 2010-063205

(51) Int. Cl.
*H04B 10/08*   (2006.01)
*G06F 13/42*   (2006.01)

(52) U.S. Cl.
CPC ................................... *G06F 13/4282* (2013.01)

(58) Field of Classification Search
CPC ..... H04J 14/02; H04J 14/0298; H04J 14/021; H04J 14/0212; H04J 14/0221; H04J 14/0293; H04J 14/0297; H04M 3/2254; H04M 3/323
USPC .................................. 398/9–38; 370/241–247
See application file for complete search history.

(56) References Cited

U.S. PATENT DOCUMENTS

| | | | | |
|---|---|---|---|---|
| 5,867,689 | A * | 2/1999 | McLain, Jr. ...................... | 703/23 |
| 6,006,019 | A * | 12/1999 | Takei ............................ | 709/224 |
| 7,162,160 | B2 * | 1/2007 | Aronson et al. ............. | 398/137 |
| 8,184,985 | B2 | 5/2012 | Kondo et al. | |
| 8,229,301 | B2 * | 7/2012 | Hahin et al. .................. | 398/135 |
| 2002/0083002 | A1 | 6/2002 | Menez et al. | |
| 2005/0286902 | A1 * | 12/2005 | Pierce et al. .................. | 398/139 |
| 2006/0051049 | A1 | 3/2006 | Hahin et al. | |
| 2008/0131139 | A1 | 6/2008 | Ishibashi | |

FOREIGN PATENT DOCUMENTS

| | | |
|---|---|---|
| JP | 2005-535271 | 11/2005 |
| JP | 2006-279246 | 10/2006 |
| JP | 2008-113207 | 5/2008 |
| JP | 2009-005406 | 1/2009 |
| JP | 2009-273047 | 11/2009 |
| WO | WO 2004/013991 | 2/2004 |

OTHER PUBLICATIONS

Japanese Office Action issued Jan. 28, 2014 for corresponding Japanese Application No. 2010-063205.

* cited by examiner

*Primary Examiner* — Khaled Kassim
*Assistant Examiner* — Zhaohui Yang
(74) *Attorney, Agent, or Firm* — Staas & Halsey LLP (57) ABSTRACT

An inter-integrated circuit (I2C) communication device, includes an I2C command transmission unit that transmits an expanded command to an optical module with which the I2C command transmission unit communicates together with software data, the expanded command including a command for transmitting the software data to the optical module and a command for collecting alarm monitor information from the optical module for monitoring the occurrence of an abnormality in the optical module, and an I2C command processing unit that, when the expanded command transmitted from the I2C command transmission unit is received, stores the software data transmitted together with the expanded command in a storage unit of the optical module, reads out the alarm monitor information stored in the storage unit, and transmits the read alarm monitor information to the I2C command transmission unit.

3 Claims, 9 Drawing Sheets

I2C COMMUNICATION DEVICE AND I2C COMMUNICATION METHOD

CROSS-REFERENCE TO RELATED APPLICATION

This application is based upon and claims the benefit of priority of the prior Japanese Patent Application No. 2010-063205, filed on Mar. 18, 2010, the entire contents of which are incorporated herein by reference.

FIELD

The embodiment discussed herein is directed to an I2C communication device and an I2C communication method.

BACKGROUND

Conventionally, it is known that an optical module that converts an electrical signal into an optical signal is mounted in a transponder unit used for optical communications. Further, it is known that the transponder unit downloads software data of the optical module to the optical module by using an inter-integrated circuit (I2C) interface disposed in the optical module. Hereinafter, this function is referred to as "module download." When the software of the optical module is revised, the transponder unit can update the optical module by performing the module download in a state in which the optical module is mounted in the transponder unit.

Figure 8:
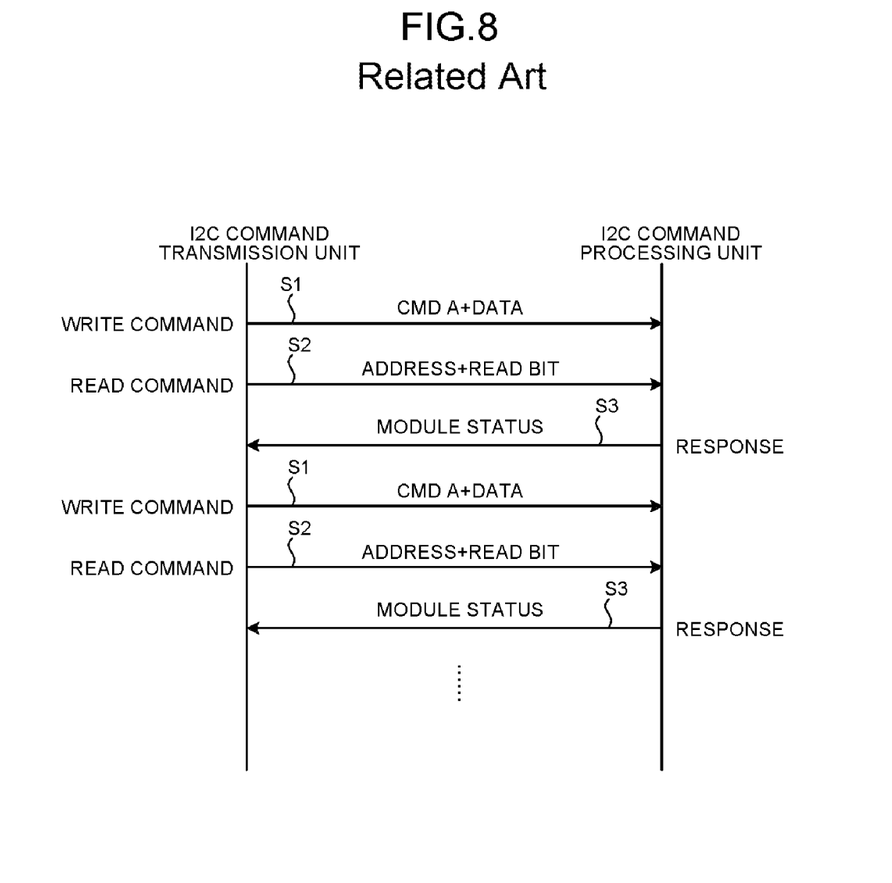
FIG. 8 is a diagram for explaining an example of a conventional data transmission technique.
Figure 9A:
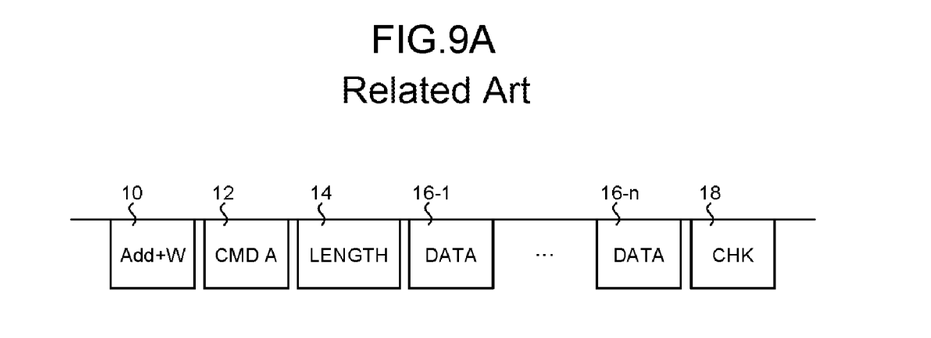
FIG. 9A is a diagram illustrating an example of a conventional communication format of I2C communication.
Figure 9B:
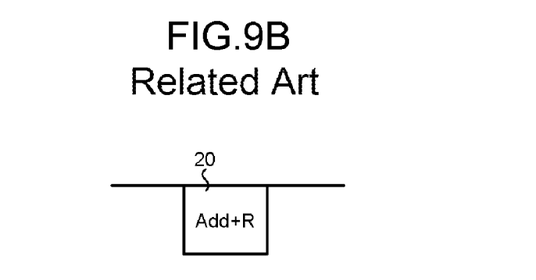
FIG. 9B is a diagram illustrating an example of a conventional communication format of I2C communication.
Figure 9C:
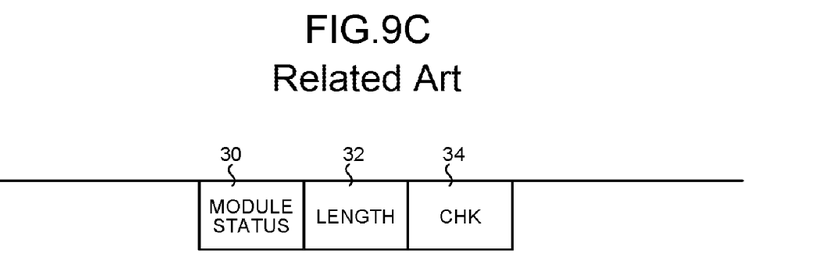
FIG. 9C is a diagram illustrating an example of a conventional communication format of I2C communication.

The module download of the conventional technology will be described below with reference to FIG. 8 and FIGS. 9A to 9C. FIG. 8 is a diagram for explaining an example of the conventional data transmission technique. FIGS. 9A to 9C are diagrams illustrating an example of the conventional communication format of I2C communication. Further, FIG. 8 illustrates an example in which I2C communication is performed between an I2C command transmission unit and an I2C command processing unit that are disposed in the transponder unit.

First, as illustrated in FIG. 8, the I2C command transmission unit transmits a data transmission command (CMD A) and software data (data) to the I2C command processing unit (step S1: write command). Specifically, as illustrated in FIG. 9A, the I2C command transmission unit transmits Add+W (Address+Write bit) 10, CMD A 12, LENGTH 14 representing the data length, DATA 16-1 to DATA 16-$n$, and CHK (CHECK) 18 representing a check bit to the I2C command processing unit.

Next, as illustrated in FIG. 8, the I2C command transmission unit transmits a read command for receiving a response signal from the optical module to the I2C command processing unit (step S2). Specifically, as illustrated in FIG. 9B, the I2C command transmission unit transmits Add+R (Address+Read bit) 20 to the I2C command processing unit. Next, the I2C command processing unit transmits a response signal to the I2C command transmission unit in response to the read command (step S3). Specifically, as illustrated in FIG. 9C, the I2C command processing unit transmits MODULE STATUS 30 representing a command processing status of the I2C command processing unit, LENGTH 32 representing the data length, and CHK 34 representing a check bit to the I2C command transmission unit. In the conventional module download, all of the software data serving as a download target is downloaded to the optical module by repetitively performing step S1 to step S3.

Further, it is known that the transponder unit not only performs the module download but also periodically collects information for monitoring the occurrence of an abnormality of the optical module (hereinafter, referred to as "alarm monitor information") from the optical module by using the I2C interface. That is, the transponder unit collects the alarm monitor information by transmitting a command for collecting the alarm monitor information from the optical module (hereinafter, referred to as "alarm monitor information collection command") to the optical module. The transponder unit can detect, for example, the occurrence of an abnormality of an output wavelength of the optical module or the occurrence of an abnormality of output power of the optical module by periodically collecting the alarm monitor information from the optical module (see, for example, Japanese Laid-open Patent Publication No. 2008-113207)

However, the conventional technology does not consider reducing a time for the module download while performing monitoring of the alarm monitor information of the optical module.

That is, the transponder unit performs collection of the alarm monitor information even during the module download as well as during a typical operation of the transponder unit. In order to perform collection of the alarm monitor information during the module download, the transponder unit alternately transmits the data transmission command for transmitting the software data to the optical module and the alarm monitor information collection command to the optical module. The alternate transmission of the data transmission command and the alarm monitor information collection command increases the time for the model download process.

Meanwhile, in order to reduce the time for the module download, transmission of the alarm monitor information collection command may be omitted. However, in this case, the transponder unit does not collect the alarm monitor information during the module download. Thus, even if an abnormality occurs in the output wavelength or the output power of the optical module, the transponder unit cannot detect the abnormality and cope with the abnormality of the optical module. As a result, there is a likelihood that the abnormality of the optical module may, cause a failure in other circuits (channels), and thus it is undesirable.

SUMMARY

According to an aspect of an embodiment of the invention, an inter-integrated circuit (I2C) communication device, includes an I2C command transmission unit that transmits an expanded command to an optical module with which the I2C command transmission unit communicates together with software data, the expanded command including a command for transmitting the software data to the optical module and a command for collecting alarm monitor information from the optical module for monitoring the occurrence of an abnormality in the optical module, and an I2C command processing unit that, when the expanded command transmitted from the I2C command transmission unit is received, stores the software data transmitted together with the expanded command in a storage unit of the optical module, reads out the alarm monitor information stored in the storage unit, and transmits the read alarm monitor information to the I2C command transmission unit.

According to another aspect of an embodiment of the invention, an inter-integrated circuit (I2C) communication method, includes transmitting an expanded command to an optical module to be communicated together with software data, the expanded command including a command for transmitting the software data to the optical module and a command for collecting alarm monitor information from the optical module for monitoring the occurrence of an abnormality in the optical module, and when the expanded command transmitted in the transmitting is received, storing the software data transmitted together with the expanded command in a storage unit of the optical module, reading out the alarm monitor information stored in the storage unit, and transmitting back the read alarm monitor information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The disclosed technique is not limited to the exemplary embodiment.

Figure 1:
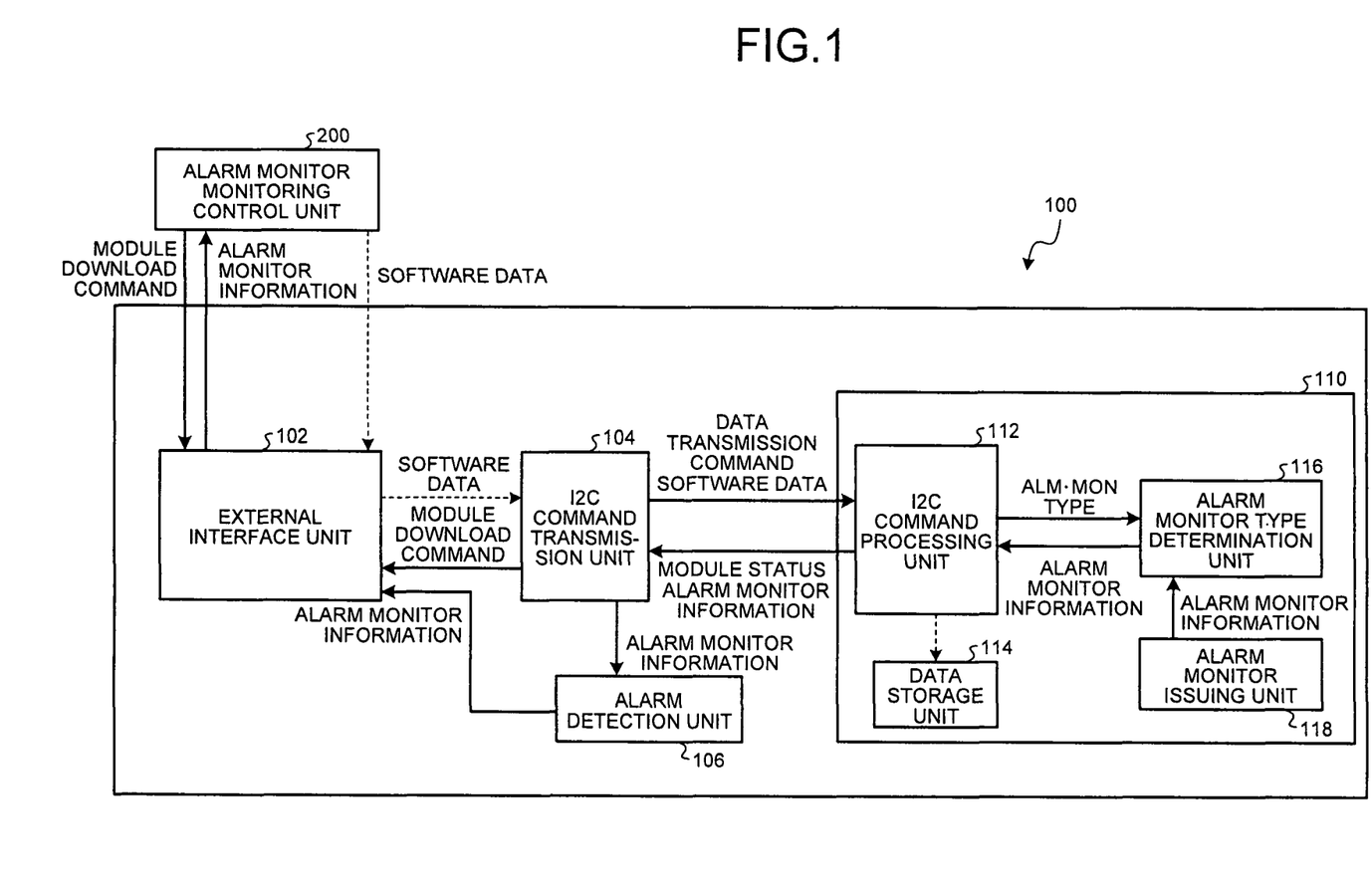
FIG. 1 is a diagram illustrating an overall configuration of a transponder unit including an I2C communication device according to an exemplary embodiment.

FIG. 1 is a diagram illustrating an overall configuration of a transponder unit including an I2C communication device according to an exemplary embodiment. As illustrated in FIG. 1, a transponder unit 100 includes an external interface unit 102, an I2C command transmission unit 104, and an alarm detection unit 106. The transponder unit 100 further includes an optical module 110. The optical module 110 includes an I2C command processing unit 112, a data storage unit 114, an alarm monitor type determination unit 116, and an alarm monitor issuing unit 118.

The external interface unit 102 is an interface with an alarm monitor monitoring control unit 200 disposed outside the transponder unit 100. The alarm monitor monitoring control unit 200 transmits a module download command and software data to the external interface unit 102. The external interface unit 102 transfers the module download command and the software data received from the alarm monitor monitoring control unit 200 to the I2C command transmission unit 104. Further, the external interface unit 102 notifies the alarm monitor monitoring control unit 200 of the alarm monitor information notified from the alarm detection unit 106.

When the module download command and the software data transferred from the external interface unit 102 are received, the I2C command transmission unit 104 transmits the data transmission command and the software data to the I2C command processing unit 112. The I2C command transmission unit 104 receives a response signal such as a module status and the alarm monitor information transmitted from the I2C command processing unit 112 and notifies the alarm detection unit 106 of the alarm monitor information. The details of the I2C command transmission unit 104 will be described later. The alarm detection unit 106 notifies the external interface unit 102 of the alarm monitor information notified from the I2C command transmission unit 104.

The I2C command processing unit 112 stores the software data received from the I2C command transmission unit 104 in the data storage unit 114. The I2C command processing unit 112 notifies the alarm monitor type determination unit 116 of ALM•MON (ALARM MONITOR) type, which is the alarm monitor information to be collected, based on the data transmission command received from the I2C command transmission unit 104. The I2C command processing unit 112 transmits the alarm monitor information notified from the alarm monitor type determination unit 116 and Module Status to the I2C command transmission unit 104. The details of the I2C command processing unit 112 will be described later.

The alarm monitor type determination unit 116 has a storage unit in which the alarm monitor information transmitted from the alarm monitor issuing unit 118 is stored. The alarm monitor type determination unit 116 selects the alarm monitor information of ALM•MON type notified from the I2C command processing unit 112 from the alarm monitor information stored in the storage unit and notifies the I2C command processing unit 112 of the selected alarm monitor information. The details of the alarm monitor type determination unit 116 will be described later.

The alarm monitor issuing unit 118 transmits the alarm monitor information of a plurality of alarm monitor types previously set for monitoring the occurrence of an abnormality of the optical module 110 to the alarm monitor type determination unit 116. The alarm monitor information includes, for example, an alarm value or a monitor value of each of the plurality of alarm monitor types. If the monitor value of the alarm monitor type is deviated from a range defined between two previously set threshold values (hereinafter, referred to as "threshold range"), the alarm monitor issuing unit 118 determines that an abnormality has currently occurred in the alarm monitor type. However, when each of the monitor values of the plurality of alarm monitor types is within the previously set threshold range, the alarm monitor issuing unit 118 determines that an abnormality has not currently occurred in the alarm monitor type. Even though the monitor value of the alarm monitor type is within the previously set threshold range, if it is deviated from another threshold range set within the threshold range, the alarm monitor issuing unit 118 determines that it is predicted that an abnormality will occur in the alarm monitor type.

Figure 2:
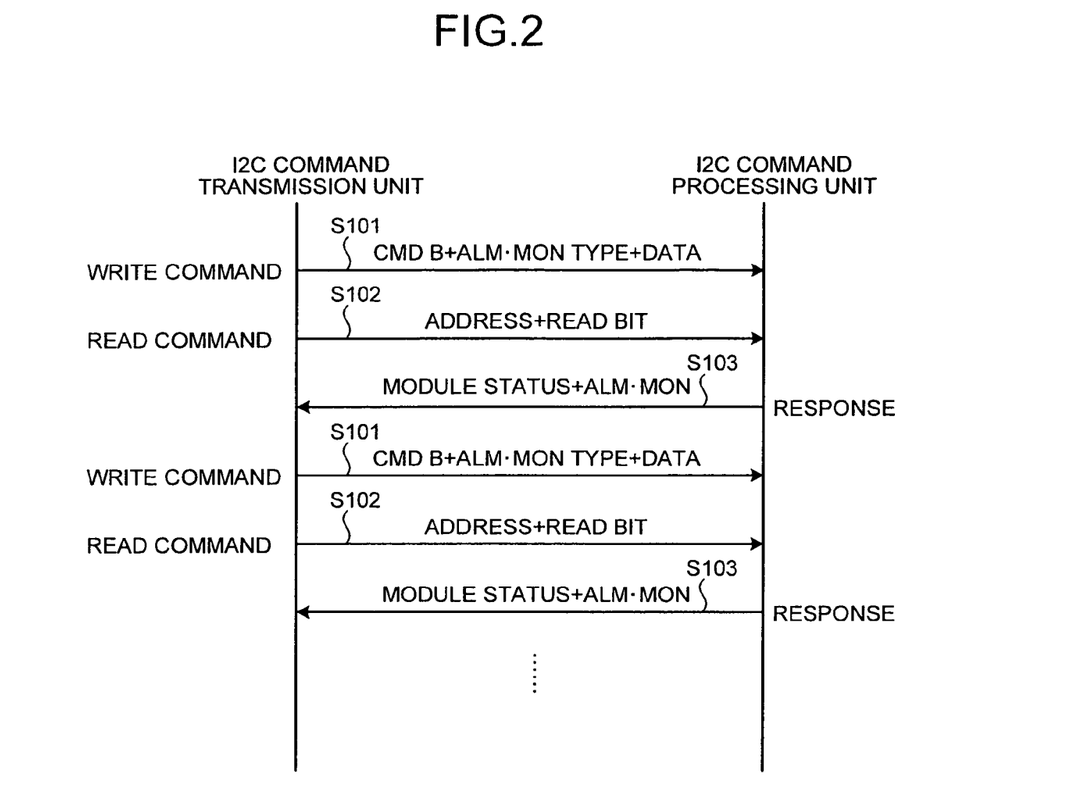
FIG. 2 is a diagram for explaining a data transmission method of an I2C communication device according to an exemplary embodiment.
Figure 3A:
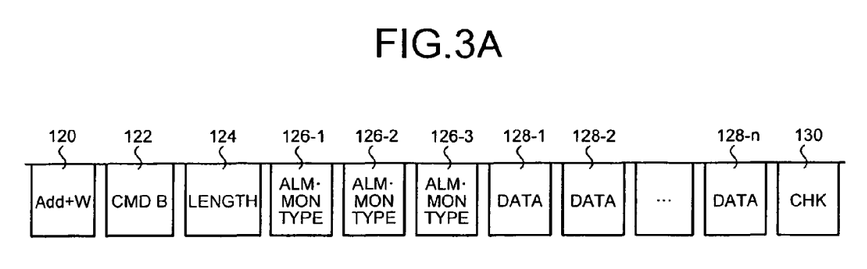
FIG. 3A is a diagram illustrating an example of a communication format of I2C communication according to an exemplary embodiment.
Figure 3B:
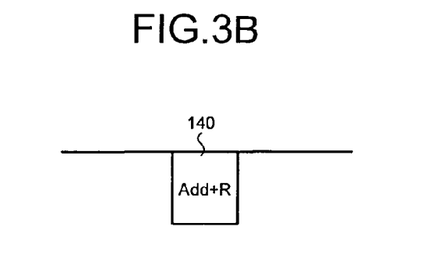
FIG. 3B is a diagram illustrating an example of a communication format of I2C communication according to an exemplary embodiment.
Figure 3C:
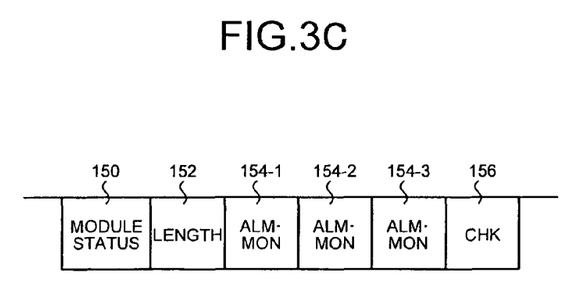
FIG. 3C is a diagram illustrating an example of a communication format of I2C communication according to an exemplary embodiment.

Next, the module download and alarm monitor information collection of the I2C communication device according to an exemplary embodiment will be described with reference to FIG. 2 and FIGS. 3A to 3C. FIG. 2 is a diagram for explaining a data transmission method of the I2C communication device according to an exemplary embodiment. FIGS. 3A to 3C are diagrams illustrating an example of a communication format of I2C communication according to an exemplary embodiment.

First, the I2C command transmission unit 104 transmits a data transmission command (CMD B) including data transmission and alarm monitor information collection, an alarm monitor type (ALM•MON TYPE), and software data (DATA) to the I2C command processing unit 112 (step S101: write command). Specifically, as illustrated in FIG. 3A, the I2C command transmission unit 104 transmits Add+W 120, CMD B 122, and LENGTH 124 representing the data length to the I2C command processing unit 112. The I2C command transmission unit 104 further transmits ALM•MON TYPE 126-1 to ALM•MON TYPE 126-3, DATA 128-1 to DATA 128-n, and CHK 130 representing a check bit to the I2C command processing unit 112. CMD B is an expanded command including a command for transmitting the software data to the optical module 110 and a command for collecting the alarm monitor information from the optical module 110. That is, CMD B is a data transmission command for which the alarm monitor information of the optical module 110 is added to the response signal transmitted from the optical module 110.

Next, as illustrated in FIG. 2, the I2C command transmission unit 104 transmits a read command for receiving a response signal from the I2C command processing unit 112 to the I2C command processing unit 112 (step S102). Specifically, as illustrated in FIG. 3B, the I2C command transmission unit 104 transmits Add+R (Address+Read bit) 140 to the I2C command processing unit 112.

Then, the I2C command processing unit 112 stores the software data received from the I2C command transmission unit 104 in the data storage unit 114 and transmits the response signal to the I2C command transmission unit 104 (step S103). Specifically, as illustrated in FIG. 3C, the I2C command processing unit 112 transmits MODULE STATUS 150 representing a command processing status of the I2C command processing unit 112 and LENGTH 152 representing the data length to the I2C command transmission unit 104. The I2C command processing unit 112 further transmits ALM•MON 154-1 to ALM•MON 154-3 that are the alarm monitor information of the optical module 110, and CHK 156 representing a check bit to the I2C command transmission unit 104. The I2C communication device according to an exemplary embodiment downloads all of the software data serving as a download target to the optical module 110 by repetitively performing step S101 to step S103. Further, an operation of step S101 to step S103 may be performed even during a service (at the time of main signal communication).

Figure 4:
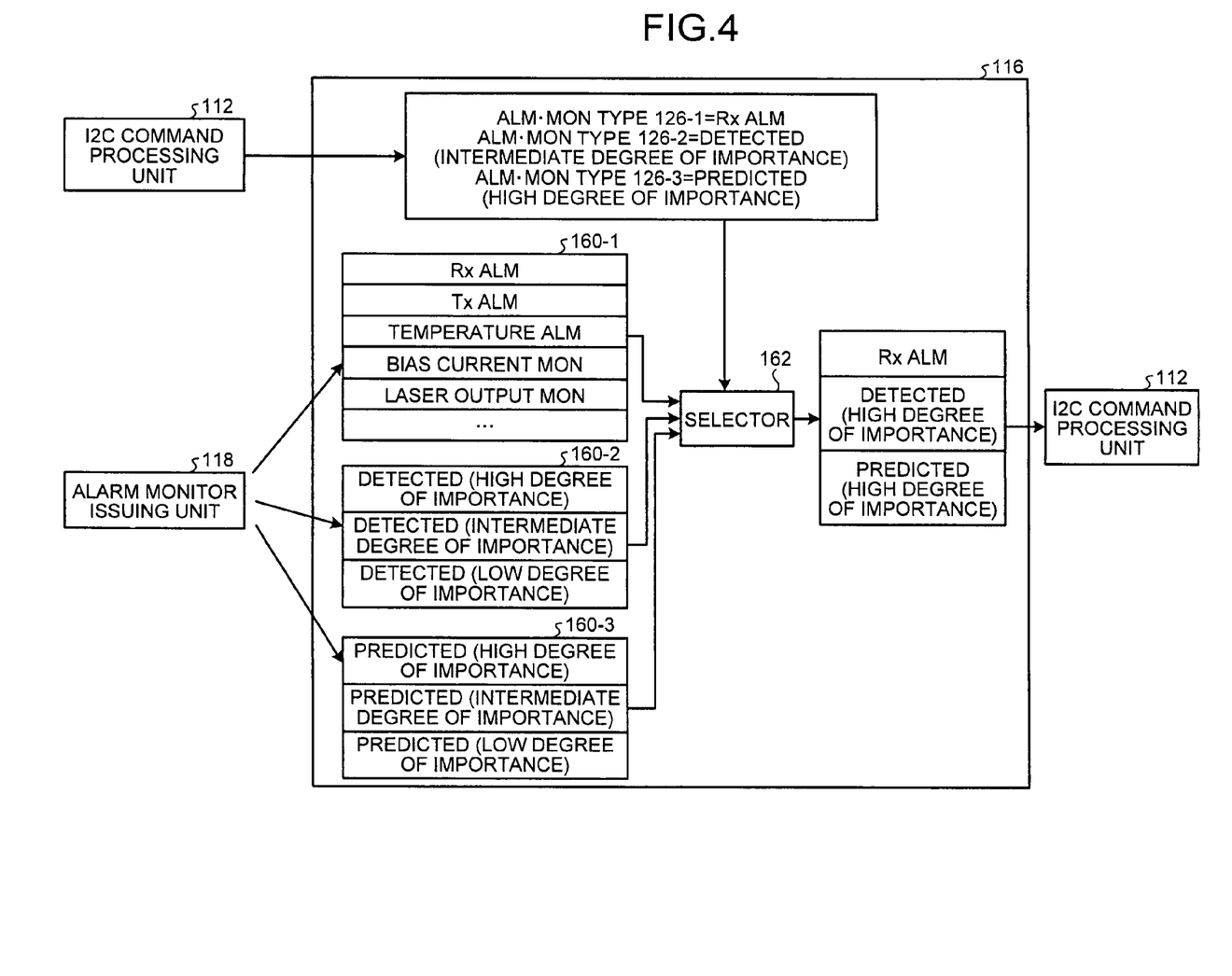
FIG. 4 is a diagram illustrating a configuration of an alarm monitor type determination unit.

Next, the details of the alarm monitor type determination unit 116 will be described. FIG. 4 is a diagram illustrating a configuration of the alarm monitor type determination unit 116. The alarm monitor type determination unit 116 includes a table 160-1 to a table 160-3 as a storage unit for storing the alarm monitor information transmitted from the alarm monitor issuing unit 118. In the present exemplary embodiment, the table 160-1 is one in which the alarm monitor information of each alarm monitor type is expressed as a table. Specifically, a plurality of alarm monitor types previously set for monitoring the occurrence of an abnormality of the optical module is set to the table 160-1. In the present exemplary embodiment, the table 160-1 stores the alarm monitor types such as Rx (Receive) ALM, Tx (Transmit) ALM, Temperature ALM, Bias Current MON (Monitor), and Laser Output MON. The monitor values are stored in Bias Current MON and Laser Output MON, respectively. Further, the alarm values are stored in Rx ALM, Tx ALM, and Temperature ALM, respectively.

Figure 5:
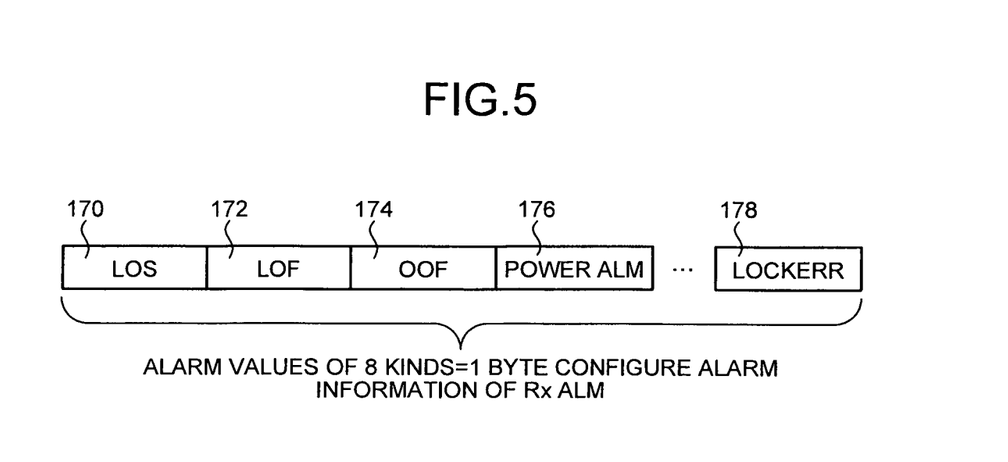
FIG. 5 is a diagram illustrating an example of a configuration of Rx ALM.

FIG. 5 is a diagram illustrating an example of a configuration of Rx ALM. For example, as illustrated in FIG. 5, one byte may be allocated to each of the alarm monitor types (the types such as Rx ALM and Tx ALM) classified in the table 160-1. In this case, each of the alarm monitor types can have eight-bit information. As illustrated in FIG. 5, Rx ALM includes LOS (Loss Of Signal) 170 representing signal loss, LOF (Loss of Frame) 172 representing loss of a frame, OOF (out of Frame) 174 representing frame synchronization loss, Power ALM 176 representing an output abnormality, and LOCKERR 178 representing a lock error. Similarly, the other alarm monitor types may have eight-bit information.

A table 160-2 is one in which a type of a measurement target in which an abnormality has currently occurred is expressed as a table according to a degree of importance. Specifically, one having a high degree of importance among the alarm monitor types for which an abnormality has currently occurred is stored in Detected (high degree of importance) of the table 160-2. Further, one having an intermediate degree of importance among the alarm monitor types for which an abnormality has currently occurred is stored in Detected (intermediate degree of importance) of the table 160-2. Further, one having a low degree of importance among the alarm monitor types for which an abnormality has currently occurred is stored in Detected (low degree of importance) of the table 160-2. The alarm value or the monitor value of the alarm monitor type for which an abnormality has currently occurred as well as the alarm monitor type for which an abnormality has currently occurred may be stored in the table 160-2.

The table 160-3 is one in which a type of a measurement target in which it is predicted that an abnormality will occur is expressed as a table according to a degree of importance. Specifically, one having a high degree of importance among the alarm monitor types for which it is predicted that an abnormality will occur is stored in Predicted (high degree of importance) of the table 160-3. Further, one having an intermediate degree of importance among the alarm monitor types for which it is predicted that an abnormality will occur is stored in Predicted (intermediate degree of importance) of the table 160-3. Further, one having a low degree of importance among the alarm monitor types for which it is predicted that an abnormality will occur is stored in Predicted (low degree of importance) of the table 160-3. The alarm value or the monitor value of the alarm monitor type for which it is predicted that an abnormality will occur as well as the alarm monitor type for which it is predicted that an abnormality will occur may be stored in the table 160-3.

The alarm monitor type determination unit 116 further includes a selector 162. The selector 162 reads out the alarm monitor information corresponding to the alarm monitor information to be collected that is notified from the I2C command processing unit 112 from the table 160-1 to the table 160-3 and transmits the read alarm monitor information to the I2C command processing unit 112. In the present exemplary embodiment, it is assumed that the alarm monitoring information to be collected that is notified from the I2C command processing unit 112 is ALM•MON TYPE 126-1=Rx ALM, ALM•MON TYPE 126-2=Detected (high degree of importance), and ALM•MON TYPE 126-3=Predicted (high degree of importance). The selector 162 reads out the alarm value of Rx ALM from the table 160-1 and transmits the read alarm value to the I2C command processing unit 112. Further, the selector 162 reads the alarm monitor type having the high degree of importance among the alarm monitor types for which an abnormality has currently occurred from the table 160-2 and transmits the read alarm monitor type to the I2C command processing unit 112. Further, the selector 162 reads the alarm monitor type having the high degree of importance among the alarm monitor types for which it is predicted that an abnormality will occur from the table 160-3 and transmits the read alarm monitor type to the I2C command processing unit 112. The I2C command processing unit 112 inserts the alarm monitor information received from the alarm monitor type determination unit 116 in ALM•MON 154-1 to ALM•MON 154-3 of the response signal of FIG. 3C and transmits the response signal to the I2C command transmission unit 104.

The I2C communication device according to the present exemplary embodiment uses the expanded command including the data transmission command and the alarm monitor information collection command. Thus, the I2C communication device according to the present exemplary embodiment can reduce the time required for the module download while performing monitoring of the alarm monitor information. That is, the I2C communication device according to the present exemplary embodiment uses the expanded command and thus does not need to alternately transmit the data transmission command and the alarm monitor information collection command, thereby reducing the time required for the module download. That is, the I2C communication device according to the present exemplary embodiment performs the module download by using the I2C communication format for which the alarm monitor information is added to the response signal of I2C communication. Therefore, the I2C communication device according to the present exemplary embodiment does not transmit the alarm monitor information collection command during the module download, and thus the time required for the module download can be reduced.

For example, considered is a case of alternately transmitting the data transmission command and the command for collecting the alarm monitor information of 10 kinds in the multi source agreement (MSA) standard. In this case, it takes about nine minutes to download software data having the data size of 1 Mbyte under the condition that the I2C rate is 100 kHz (the MSA standard) and the write command length is 18 types (the MSA standard). On the other hand, the I2C communication device according to the present exemplary embodiment can reduce the download time of software having the data size of 1 Mbyte by about two minutes. Further, the I2C communication device according to the present exemplary embodiment can increase the time that can be reduced in proportion to the data size of the software to be downloaded.

Figure 6:
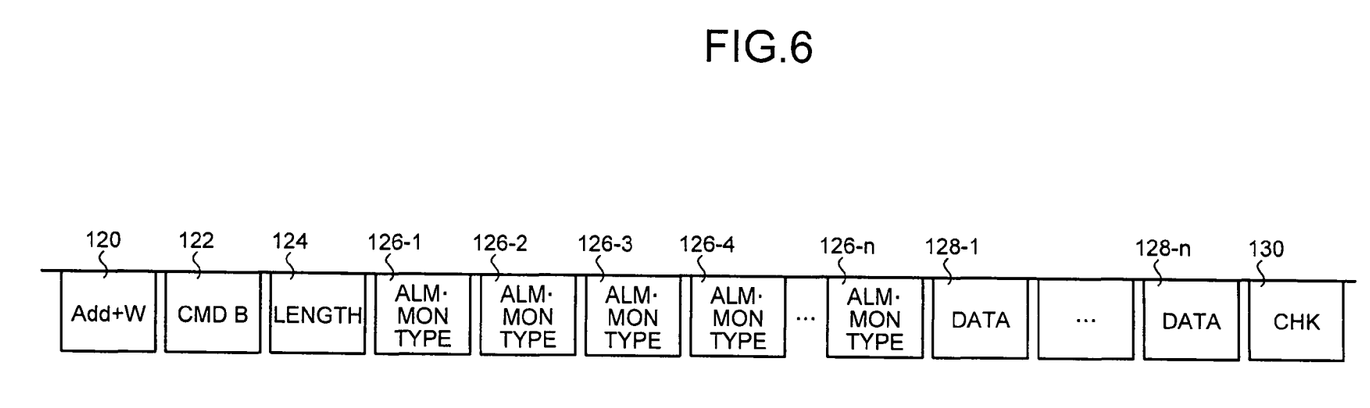
FIG. 6 is a diagram illustrating a modification example of a communication format of I2C communication according to the exemplary embodiment.

Further, in the present exemplary embodiment, the I2C command transmission unit 104 transmits the command for collecting the three kinds of the alarm monitor information to the I2C command processing unit 112, but it is not limited thereto. FIG. 6 is a diagram illustrating a modification example of the communication format of I2C communication according to the present exemplary embodiment. As illustrated in FIG. 6, the I2C communication device can expand the number of alarm information to be collected by adding ALM•MON TYPE 126-4 to ALM•MON TYPE 126-n to the I2C communication frame. In the same manner as described above, the alarm monitor type determination unit 116 reads out the alarm monitor information designated by ALM•MON TYPE 126-1 to ALM•MON TYPE 126-n from the table 160-1 to the table 160-3 and transmits the read alarm monitor information to the I2C command processing unit 112. The I2C command processing unit 112 inserts the alarm monitor information received from the alarm monitor type determination unit 116 in the response signal and transmits the response signal to the I2C command transmission unit 104.

Figure 7:
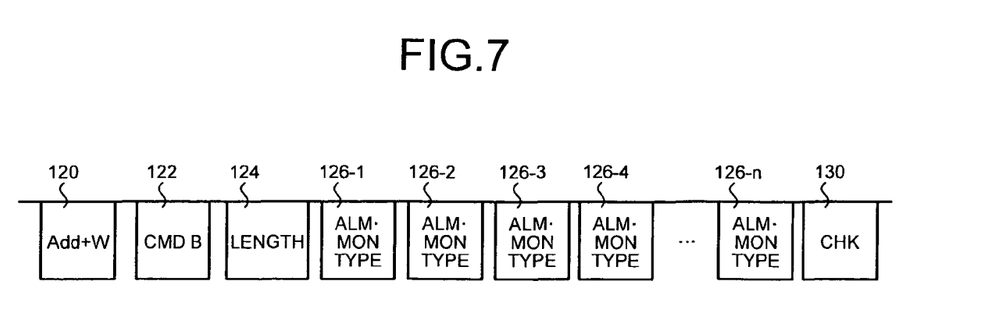
FIG. 7 is a diagram illustrating a modification example of a communication format of I2C communication according to the exemplary embodiment.

Further, the present exemplary embodiment may be applied even to the alarm monitor information collection command of the I2C communication device that does not have a function of transmitting the software data. FIG. 7 is a diagram illustrating a modification example of a communication format of I2C communication according to the present exemplary embodiment. As illustrated in FIG. 7, the I2C communication device can perform only collection of the alarm monitor information without performing transmission of the software data by deleting DATA 128-1 to DATA 128-n from the I2C communication frame. Even in this case, the I2C communication device can arbitrarily set the number of the alarm monitor types for collecting the alarm monitor information by designating ALM•MON TYPE 126-1 to ALM•MON TYPE 126-n.

As described above, the I2C communication device according to the present exemplary embodiment can improve a degree of freedom of the number of the alarm monitor types for collecting the alarm monitor information. For example, if the alarm monitor information collection command is previously fixed to collect all types of the alarm monitor information, the transponder unit 100 collects even the alarm monitor information that does not need to be collected. As a result, the amount of data transmitted from the optical module 110 increases. In the case of including the alarm monitor information in the response signal corresponding to the data transmission command and transmitting the response signal, if the amount of data transmitted from the optical module 110 increases, the alarm monitor information may not be included in the response signal, and thus it is undesirable. On the other hand, the I2C communication device according to the present exemplary embodiment can freely expand the number of the alarm monitor types for collecting the alarm monitor information by designating ALM•MON TYPE 126-1 to ALM•MON TYPE 126-n. Therefore, the I2C communication device according to the present exemplary embodiment collects only the alarm monitor information that should be collected, and thus the amount of data transmitted from the optical module 110 can be reduced.

Further, the I2C communication device according to the present exemplary embodiment does not omit transmission of the alarm monitor information collection command during the module download, and thus the alarm monitor information can be collected during the module download. Therefore, the I2C communication device according to the present exemplary embodiment can detect the occurrence of an abnormality of the output wavelength or the output power of the optical module during the module download. As a result, the I2C communication device according to the present exemplary embodiment can rapidly cope with the detected abnormality of the optical module, and thus suppress a likelihood of the abnormality of the optical module to cause a failure in other circuits (channels).

According to an aspect of the I2C communication device disclosed in the present application, it is possible to reduce the time for the module download while performing monitoring of the alarm monitor information of the optical module.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable storage medium having stored therein an inter-integrated circuit (I2C) communication program causing a computer to execute a process comprising:

transmitting, in an I2C command transmission unit, an expanded command together with software data to an optical module with which the I2C command transmission unit communicates; and storing, when the expanded command transmitted from the I2C command transmission unit is received in an I2C command processing unit, the software data transmitted together with the expanded command in a storage unit of the optical module, reading out alarm monitor information stored in the storage unit, and transmitting the read alarm monitor information to the I2C command transmission unit, wherein the alarm monitor information includes an alarm monitor type for which it is determined that an abnormality has occurred based on an alarm value or a monitor value of each of a plurality of alarm monitor types among the plurality of alarm monitor types previously set for monitoring the occurrence of an abnormality of the optical module, the process includes making a first table in which the alarm monitor information of each alarm monitor type is expressed, a second table in which the alarm monitor type of a measurement target in which an abnormality has currently occurred is expressed according to a rank of a degree of importance of the abnormality occurrence, and a third table in which the alarm monitor type of a measurement target in which it is predicted that an abnormality will occur is expressed according to the rank of the degree of importance, the expanded command is a command capable of designating the alarm monitor type for collecting the alarm value or the monitor value from among the plurality of alarm monitor types and designating the rank, and the reading out reads out the alarm value or the monitor value corresponding to the alarm monitor type designated by the expanded command and the alarm monitor type of the rank of a degree of importance designated by the expanded command from the first table, the second table and the third table and the transmitting transmits the read alarm value or the read monitor value and the read alarm monitor type to the I2C command processing unit.

2. A non-transitory computer readable storage medium having stored therein an inter-integrated circuit (I2C) communication program causing a computer to execute a process comprising:

transmitting, in an I2C command transmission unit, an expanded command together with software data to an optical module with which the I2C command transmission unit communicates; and storing, when the expanded command transmitted from the I2C command transmission unit is received in an I2C command processing unit, the software data transmitted together with the expanded command in a storage unit of the optical module, reading out alarm monitor information stored in the storage unit, and transmitting the read alarm monitor information to the I2C command transmission unit, wherein the alarm monitor includes an alarm monitor type for which it is predicted that an abnormality will occur based on an alarm value or a monitor value of each of a plurality of alarm monitor types among the plurality of alarm monitor types previously set for monitoring the occurrence of an abnormality of the optical module, the process includes making a first table in which the alarm monitor information of each alarm monitor type is expressed, a second table in which the alarm monitor type of a measurement target in which an abnormality has currently occurred is expressed according to a rank of a degree of importance of the abnormality occurrence, and a third table in which the alarm monitor type of a measurement target in which it is predicted that an abnormality will occur is expressed according to the rank of the degree of importance, the expanded command is a command capable of designating the alarm monitor type for collecting the alarm value or the monitor value from among the plurality of alarm monitor types and designating the rank, and the reading out reads out the alarm value or the monitor value corresponding to the alarm monitor type designated by the expanded command and the alarm monitor type of the rank of a degree of importance designated by the expanded command from the first table, the second table and the third table and the transmitting transmits the read alarm value or the read monitor value and the read alarm monitor type to the I2C command processing unit.

3. An inter-integrated circuit (I2C) communication method, comprising:

transmitting, in a transmission unit, an expanded command together with software data to an optical module to be communicated;

when the expanded command transmitted in the transmission unit is received in a processing unit, storing the software data transmitted together with the expanded command in a storage unit of the optical module, reading out alarm monitor information stored in the storage unit, the alarm monitor information including an alarm monitor type for which it is determined that an abnormality has occurred based on an alarm value or a monitor value of each of a plurality of alarm monitor types among the plurality of alarm monitor types previously set for monitoring the occurrence of an abnormality of the optical module, and transmitting back the read alarm monitor information; and making a first table in which the alarm monitor information of each alarm monitor type is expressed, a second table in which the alarm monitor type of a measurement target in which an abnormality has currently occurred is expressed according to a rank of a degree of importance of the abnormality occurrence, and a third table in which the alarm monitor type of a measurement target in which it is predicted that an abnormality will occur is expressed according to the rank of the degree of importance, wherein the expanded command is a command capable of designating the alarm monitor type for collecting the alarm value or the monitor value from among the plurality of alarm monitor types and designating the rank, and the reading out reads out the alarm value or the monitor value corresponding to the alarm monitor type designated by the expanded command and the alarm monitor type of the rank of a degree of importance designated by the expanded command from the first table, the second table and the third table and the transmitting transmits the read alarm value or the read monitor value and the read alarm monitor type to the I2C command processing unit.

* * * * *

UNITED STATES PATENT AND TRADEMARK OFFICE
CERTIFICATE OF CORRECTION

| | | |
|---|---|---|
| PATENT NO. | : 9,135,207 B2 | Page 1 of 1 |
| APPLICATION NO. | : 12/929905 | |
| DATED | : September 15, 2015 | |
| INVENTOR(S) | : Miyazaki et al. | |

It is certified that error appears in the above-identified patent and that said Letters Patent is hereby corrected as shown below:

In the claims

Claim 2, Column 10, Line 4

After "monitor" insert --information--.

Signed and Sealed this
Fifteenth Day of December, 2015

Michelle K. Lee
*Director of the United States Patent and Trademark Office*